United States Patent [19]

Imazeki et al.

[11] 4,216,432
[45] Aug. 5, 1980

[54] AUTOMATIC SWITCHING SYSTEM FOR A COMBINATION TRANSCEIVER-AUXILLIARY RECEIVER RADIO

[75] Inventors: Kazuyoshi Imazeki; Koichi Kazami, both of Tokyo, Japan

[73] Assignee: General Research of Electronics, Inc., Tokyo, Japan

[21] Appl. No.: 831,421

[22] Filed: Sep. 8, 1977

[51] Int. Cl.² ........................... H04B 1/40; H04B 1/44
[52] U.S. Cl. ........................................ 455/79; 455/296
[58] Field of Search ................... 325/21, 22, 302, 303, 325/306, 473

[56] References Cited
U.S. PATENT DOCUMENTS 3,887,872  6/1975  Sharpe ..................................... 325/21

OTHER PUBLICATIONS

George Sante "CB Switcher for Music Between Calls" 12-3-77, Radio-Electronic, pp. 40-41.

Primary Examiner—John C. Martin
Assistant Examiner—Edward L. Coles
Attorney, Agent, or Firm—Trexler, Wolters, Bushnell & Fosse, Ltd.

[57] ABSTRACT

In a radio of the type having a selectively operable transmitter portion and an associated receiver portion for two-way communication, such as a CB radio, plus an auxilliary receiver for reproducing auxilliary audio signals, such as an AM/FM radio, a system is provided for automatically interrupting the audio signal output of the auxilliary receiver whenever the transmitter portion is operated. When the transmit/receive switch is in the transmit position, an auxilliary electronic switch interrupts the audio output of the auxilliary receiver by by-passing to ground the audio signal input to the audio amplifier section of the auxilliary receiver.

2 Claims, 2 Drawing Figures

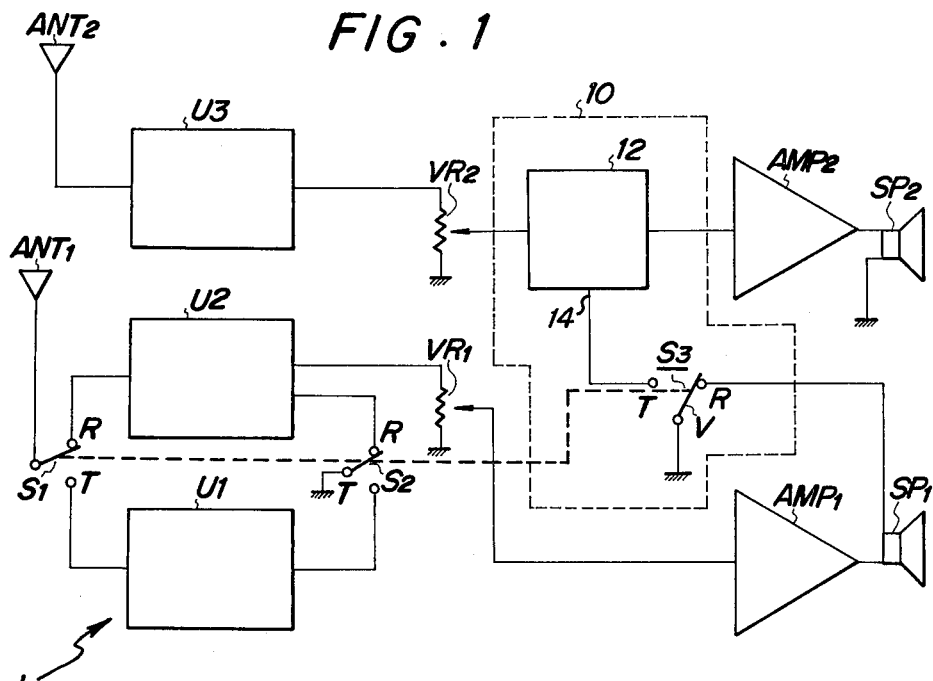

AUTOMATIC SWITCHING SYSTEM FOR A COMBINATION TRANSCEIVER-AUXILLIARY RECEIVER RADIO

BACKGROUND OF THE INVENTION

This invention relates generally to an automatic switching system for a combination transceiver-auxilliary receiver radio and, more particularly, to such a system for automatically interrupting the audio signal output of the auxilliary receiver when the transceiver is operated in the transmit mode.

Such a radio may take the form of a citizen's band (CB) transceiver combined with an AM/FM radio. In a CB transceiver that is equipped with a broadcast radio receiver, it is desirable to provide an amplifier and speaker for the radio receiver disposed separately from an amplifier and speaker for the receiver portion of the transceiver for reasons of convenience and differing frequency response characteristics. When the transceiver is in the receiving mode, according to a usual manner of the operation of the transceiver, the broadcast radio receiver is also in the receiving mode. Thus, both amplifiers and speakers are connected for operation by their respective receivers. Preferably the CB transceiver is so constructed that in its transmitting mode the receiver portion is automatically disabled. However, to avoid broadcast radio interference in the transmitting mode, it is also desirable that the broadcast radio receiver be automatically disabled, and with a minimum of cost and noise generation.

It is therefore an object of the invention to provide a new and improved system for automatically interrupting the audio signal output of the auxilliary receiver whenever the transmitter portion of the transceiver is activated.

It is another object of the invention to provide such a system which is relatively simple and economical to construct and which minimizes the amount of spurious noise generation during switching.

SUMMARY OF THE INVENTION

In accordance with the invention, in a radio of the type having a selectively operable transmitter portion and an associated receiver portion for two-way communication, plus an auxilliary receiver for reproducing auxilliary audio signals, a system is provided for automatically interrupting the audio signal output of the auxilliary receiver whenever the transmitter portion is operated. The system comprises first switch means coupled to the transmitter portion and associated receiver portion for enabling selective activation of the transmitter portion and associated receiver portion. Auxilliary switch means are coupled between the first switch means and the auxilliary receiver, and are responsive to the operation of the first switch means to activate the transmitter portion, for interrupting the audio output of the auxilliary receiver, whereby the audio output of the auxilliary receiver is automatically interrupted whenever the transmitter is operated.

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference characters identify like elements, and in which:

FIG. 1 is a block diagram of a preferred embodiment of an automatic switching system for a combination transceiver-auxilliary receiver radio constructed in accordance with the principles of the present invention; and FIG. 2 is an electrical schematic diagram of a circuit utilized in the preferred embodiment of the invention illustrated in FIG. 1.

DESCRIPTION OF THE PREFERRED EMBODIMENT

Referring to the block diagram of FIG. 1, a transceiver 1 such as a CB radio, includes a selectively operable transmitter portion $U_1$ and an associated receiver portion $U_2$ for two-way communication, plus an auxilliary receiver $U_3$ for reproducing auxilliary audio signals. An antenna $ANT_1$, volume control $VR_1$, audio amplifier $AMP_1$, and speaker $SP_1$ are used in the conventional manner for the transceiver portion of the unit; likewise with respect to antenna $ANT_2$, volume control $VR_2$, audio amplifier $AMP_2$, and speaker $SP_2$ for the auxilliary receiver portion of the unit. Since all such elements are of known constuction, it is unnecessary to describe them in greater detail. It is understood, of course, that although the invention is described herein particularly with reference to a combination AM/FM radio and CB transceiver, the principles involved may be applied to various types of combination transceiver-auxilliary receiver units.

In accordance with the illustrated embodiment of the invention, a system 10 for automatically interrupting the audio signal output of the auxilliary receiver whenever said transmitter portion of the transceiver is operated comprises first switch means, including switches $S_1$ and $S_2$, coupled to transmitter portion $U_1$ and associated receiver portion $U_2$ for enabling selective activation of transmitter portion $U_1$ and associated receiver portion $U_2$. An auxilliary switch means, including switch $S_3$ and electronic switching circuit 12, is coupled between switches $S_1$ and $S_2$ and the input of audio amplifier $AMP_2$ of the auxilliary receiver. In general, switch $S_3$ is responsive to the operation of switches $S_1$ and $S_2$ to activate transmitter portion $U_1$, for interrupting the audio output of the auxilliary receiver, whereby the audio output of the auxilliary receiver is automatically interrupted whenever the transmitter is operated. The system thus prevents undesirable effects such as the auxilliary receiver output getting into the transmitted CB signal.

More particularly, and with reference to FIG. 2, the electronic switching circuit 12 of FIG. 1 comprises a switching transistor $Q_2$ having its emitter-collector junction coupled in parallel, via DC isolation capacitor $C_2$, with the input of audio amplifier $AMP_2$. Switching transistor $Q_2$ has its base coupled to the first switch means ($S_1$ and $S_2$ of FIG. 1) by way of driver transistor $Q_1$, terminal 14, and switch $S_3$. Operating switches $S_1$ and $S_2$ to the transmit position causes switch $S_3$ to ground the base of driver transistor $Q_2$ through diode $D_1$, thus turning off driver transistor $Q_1$. Turning off driver transistor $Q_1$ causes its collector voltage to substantially increase and thus turn on switching transistor $Q_2$, thereby by-passing to ground audio input signals applied to the input of amplifier $AMP_2$. This provides a relatively noise-free and automatic interruption of the audio output of the auxilliary AM/FM receiver when the CB transceiver is in the transmit mode. It is understood that there are at least several points in the auxilliary receiver circuit (e.g. between the antenna $Ant_2$ and tuning circuitry $U_3$, within audio amplifier $AMP_2$, or between amplifier $AMP_2$ and speaker $SP_2$) where switching transistors may be inserted, either in series or in parallel, without departing from the principles of the invention.

Thus there has been shown and described a new and improved system for automatically interrupting the audio signal output of an auxilliary receiver of a combination transceiver-auxilliary receiver unit whenever the transmitter is operated. The system utilizes a relatively simple and inexpensive electronic circuit to effect such automatic switching with a minimum of spurious noise signal generation during switching.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design and other being apparent only after study. As such, the scope of the invention should not be limited by the particular embodiment and specific construction described herein but should be defined by the appended claims and equivalents thereof. Accordingly, the air in the appended claims is to cover all such changes and modifications as fall within the true spirit and scope of the invention.

The invention is claimed as follows:

1. In a radio of the type having a selectively operable transmitter portion and an associated receiver portion for two-way communication, plus an auxiliary receiver for reproducing auxiliary audio signals, said auxiliary receiver including a tuning section and an audio amplifier section, said tuning section having its output coupled to the input of said audio amplifier section, a system for automatically interrupting the audio signal output of said auxiliary receiver whenever said transmitter portion is operated, said system comprising: first switch means coupled to said transmitter portion and associated receiver portion for enabling selective activation of said transmitter portion and associated receiver portion; auxiliary switch means comprising an electronic circuit coupled between said first switch means and said auxiliary receiver, said electronic circuit comprising a switching transistor having its emitter-collector junction coupled in parallel with the input of said audio amplifier section, said switching transistor having its base coupled to said first switch means and responsive to said first switch being operated to activated said transmitter portion for by-passing signals applied to the input of said audio amplifier section from said tuner section, whereby actuation of the switching transistor interrupts the audio reproduction by said auxiliary receiver to prevent the transmitted signal from including the auxiliary audio signal.

2. A system in accordance with claim 1, in which said electronic circuit further includes a driver transistor coupled between said first switch means and said switching transistor, with said driver transistor being biased on when said first switch means activates said associated receiver and being biased off when said first switch means activates said transmitter, and with the collector of said driver transistor being coupled to the base of said switching transistor.

* * * * *